US009935967B2

(12) United States Patent
Tao (10) Patent No.: US 9,935,967 B2
(45) Date of Patent: Apr. 3, 2018

(54) METHOD AND DEVICE FOR DETECTING MALICIOUS URL

(71) Applicant: TENCENT TECHNOLOGY (SHENZHEN) COMPANY LIMITED, Shenzhen (CN)

(72) Inventor: Sinan Tao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 5 days.

(21) Appl. No.: 14/711,560

(22) Filed: May 13, 2015

(65) Prior Publication Data

US 2015/0244728 A1 Aug. 27, 2015

Related U.S. Application Data

(63) Continuation of application No. PCT/CN2013/086537, filed on Nov. 5, 2013.

(30) Foreign Application Priority Data

Nov. 13, 2012 (CN) .......................... 2012 1 0453701

(51) Int. Cl.
*H04L 29/06* (2006.01)
*H04L 29/08* (2006.01)
*G06F 17/30* (2006.01)

(52) U.S. Cl.
CPC ........ *H04L 63/14* (2013.01); *G06F 17/30902* (2013.01); *H04L 63/1483* (2013.01); *H04L 67/02* (2013.01)

(58) Field of Classification Search
None
See application file for complete search history.

(56) References Cited

U.S. PATENT DOCUMENTS

| 7,865,953 | B1 * | 1/2011 | Hsieh | ............... G06F 17/30887 726/22 |
| 2005/0050150 | A1 * | 3/2005 | Dinkin | ................ G06Q 10/107 709/207 |

(Continued)

FOREIGN PATENT DOCUMENTS

| CN | 101055621 A | 10/2007 |
| CN | 101145902 A | 3/2008 |

(Continued)

OTHER PUBLICATIONS

IEEE, "The Authoritative Dictionary of IEEE Standards Terms", 7th ed., 2000, IEEE Press., p. 1-3.*

(Continued)

*Primary Examiner* — Jeffery Williams
(74) *Attorney, Agent, or Firm* — Anova Law Group, PLLC (57) ABSTRACT

Examples of the present disclosure provide a method and device for detecting a malicious URL, the method includes: a URL detection request is received, contents of a page addressed by a URL in the URL detection request are analyzed, and it is determined that whether the page is a non-text page; when the page is a non-text page, a page image of the page, which is displayed in a browser and addressed by the URL in the URL detection request, is obtained, image detection is performed on the page image, and a page attribute of the URL in the URL detection request is obtained, whether the URL is a malicious URL is determined based on the page attribute of the URL in the URL detection request.

18 Claims, 5 Drawing Sheets

(56) References Cited

U.S. PATENT DOCUMENTS

| | | | | |
|---|---|---|---|---|
| 2008/0049027 A1* | 2/2008 | Hauke | ............... | H04N 7/163 |
| | | | | 345/502 |
| 2008/0253623 A1* | 10/2008 | Hauke | ............... | G06K 9/00288 |
| | | | | 382/118 |
| 2010/0211551 A1* | 8/2010 | Ryu | ............... | H04L 12/583 |
| | | | | 707/687 |
| 2010/0287246 A1* | 11/2010 | Klos | ............... | H04L 29/06 |
| | | | | 709/206 |
| 2012/0174224 A1* | 7/2012 | Thomas | ............... | G06F 21/566 |
| | | | | 726/24 |
| 2012/0240224 A1* | 9/2012 | Payne | ............... | H04L 63/1416 |
| | | | | 726/21 |
| 2014/0052508 A1* | 2/2014 | Pandey | ............... | H04W 12/12 |
| | | | | 705/14.4 |
| 2014/0164146 A1* | 6/2014 | Goswami | ............... | G06T 7/0002 |
| | | | | 705/14.72 |
| 2014/0380482 A1* | 12/2014 | Thomas | ............... | G06F 21/566 |
| | | | | 726/24 |
| 2016/0154822 A1* | 6/2016 | Goswami | ............... | G06T 7/0002 |
| | | | | 707/727 |

FOREIGN PATENT DOCUMENTS

| | | |
|---|---|---|
| CN | 101324888 A | 12/2008 |
| CN | 102004779 A | 4/2011 |
| CN | 102054028 A | 5/2011 |
| CN | 102063484 A | 5/2011 |
| WO | 2009131469 A1 | 10/2009 |

OTHER PUBLICATIONS

Microsoft, "Computer Dictionary", 5th ed., 2002, Microsoft Press., p. 1-3.*
China Office Action dated Sep. 26, 2014 re: Application No. 201210453701.1; pp. 1-14; citing: CN101055621A and CN102054028A.
International Preliminary Report on Patentability and Written Opinion dated Jan. 30, 2014 re: Application No. PCT/CN2013/086537; pp. 1-8; citing: CN101145902A, CN102004779A, CN102063484A and CN101324888A.
European Search Report dated Nov. 13, 2015 re: Application No. PCT/CN2013/086537; pp. 1-5; U.S. Pat. No. 7,865,953 B1 and WO 2009/131469 A1.
International Search Report dated Jan. 30, 2014 re: Application No. PCT/CN2013/086537; citing: CN 10114502 A, CN 102004779 A, CN 102063484 A and CN 101324888 A.
Written Opinion dated Jan. 30, 2014 re: Application No. PCT/CN2013/086537; citing: CN 101145902 A, CN 102004779 A, CN 102063484 A and CN 101324888 A.

* cited by examiner

METHOD AND DEVICE FOR DETECTING MALICIOUS URL

CROSS-REFERENCES TO RELATED APPLICATIONS

This application is a continuation of International Application No. PCT/CN2013/084336, filed on Sep. 26, 2013, which claims the benefit of Chinese Patent Application No. 201210453701.1, filed on Nov. 13, 2012, where the disclosures of both of said applications are incorporated herein by reference in their entirety.

FIELD

The present disclosure relates to (Uniform/Universal Resource Locator, URL) detection field, and more particularly, to a method and device for detecting a malicious URL.

BACKGROUND

The network enriches people's life, but more and more pornography, fraud, phishing web sites also emerge, and bring a serious threat to the security of the majority of Internet users when obtaining information on the Internet. Thus a detection engine for identifying malicious URLs is needed.

An existing URL cloud detection engine may effectively identify and prompt whether a URL accessed by a user has a malicious behavior. After the user inputs a URL to be accessed and before the browser displays corresponding page content, it is necessary for the URL cloud detection engine to obtain malicious attributes of the URL to be accessed by the user from a cloud detection center, identify whether the URL to be accessed by the user has a malicious behavior, and provide relevant prompts based on the identification result. Due to the malicious web sites are variant, the URL cloud detection engine must possess fast, efficient and accurate characteristics, so as to ensure that the malicious web sites may be timely and accurately found.

The identification for malicious attributes by existing URL cloud detection engine may be performed through text information of page DOM and BOM object, and using machine learning manner, such as Bayes classifier/keyword filtering and similarity matching. Although above technology may effectively identify text-based malicious fraud web site, the technology may not effectively identify non-text web content.

Moreover, the malicious pages in the prior art may evade the killing of detection engine through the following means.

(1) Text content is converted into an image. The contents of the whole page are made into an image, thus the killing is fought against through the manner that whole page is an image.

(2) Plaintext is encrypted and hidden. Since current detection engine mainly relies on the text information of the page, malicious webpage editors process the text information of a plaintext using encryption technology. When encountering an encrypted string without any semantics, an identification module of the detection engine cannot effectively identify the malicious webpage.

(3) Streaming media is used to fight against the detection engine. In order to prevent from being identified by current detection technology, in the existing malicious webpage, text information is hidden and displayed in a streaming media, such as a Flash. Thus the killing of existing detection technology may be evaded effectively.

(4) Normal text information is adopted to interfere with the killing of a detection engine. In order to evade the killing of existing detection technology, a large amount of normal text which is not displayed may be added to page contents to interfere with the identification module.

Therefore, how to efficiently and accurately detect the malicious URL has become a difficult problem and challenge for detection technology.

SUMMARY

According to examples of the present disclosure, a method and device for detecting a malicious URL is provided to efficiently and accurately detect a malicious URL, and protect the security of users when obtaining online information.

The method for detecting a malicious URL provided by an example of the present disclosure includes: receiving a URL detection request, analyzing a page addressed by a URL in the URL detection request, and determining whether the page is a non-text page; when determining that the page is a non-text page, obtaining a page image of the page, which is displayed in a browser and addressed by the URL in the URL detection request; performing image detection on the page image, and obtaining a page attribute of the URL in the URL detection request; determining whether the URL is a malicious URL according to the page attribute of the URL in the URL detection request.

The device for detecting a malicious URL provided by an example of the present disclosure includes: a page analyzing module, configured to receive a URL detection request, analyze a page addressed by a URL in the URL detection request, and determine whether the page is a non-text page; and a page attribute identifying module, configured to, when the page analyzing module determines that the page is a non-text page, obtain a page image of the page which is displayed in a browser and addressed by the URL in the URL detection request, perform image detection on the page image, obtain a page attribute of the URL in the URL detection request, and determine whether the URL is a malicious URL according to the page attribute of the URL in the URL detection request.

The device for detecting a malicious URL provided by another example of the present disclosure includes: a memory and a processor in communication with the memory; the memory store a group of instructions which may be executed by the processor, and the instructions comprise: a page analyzing instruction, to indicate receiving a URL detection request, analyzing contents of a page addressed by a URL in the URL detection request, and determining whether the page is a non-text page; and a page attribute identifying instruction, to indicate, when the page analyzing module determines that the page is a non-text page, obtaining a page image of the page which is displayed in a browser and addressed by the URL in the URL detection request, performing image detection on the page image, obtaining a page attribute of the URL in the URL detection request, and determining whether the URL is a malicious URL according to the page attribute of the URL in the URL detection request.

As can be seen from the above technical solutions of the present disclosure, contents of the page addressed by the URL in the URL detection request are analyzed. When it is determined that the page is a non-text page, a page snapshot is performed on the page which is addressed by the URL and displayed in the background of the browser, and snapshotted page image is detected to obtain a page attribute of the URL in the URL detection request. When it is determined that the page is a text page, text of the page is detected to obtain a page attribute of the URL in the URL detection request. Subsequently, whether the URL is a malicious URL is determined according to the page attribute of the URL in the URL detection request. Method for detecting a malicious URL based on the example of the present disclosure may effectively identify not only a malicious URL of which the whole webpage is an image, but also a malicious URL evading detection through various encryption methods, malicious interference, and so on. Thus the security of users when obtaining online information may be further ensured.

BRIEF DESCRIPTION OF THE DRAWINGS

Features of the present disclosure are illustrated by way of example and not limited in the following figures, in which like numerals indicate like elements, in which.

DETAILED DESCRIPTION

Reference will now be made in detail to examples, which are illustrated in the accompanying drawings. In the following detailed description, numerous specific details are set forth in order to provide a thorough understanding of the present disclosure. Also, the figures are illustrations of an example, in which modules or procedures shown in the figures are not necessarily essential for implementing the present disclosure. In other instances, well-known methods, procedures, components, and circuits have not been described in detail so as not to unnecessarily obscure aspects of the examples. As used herein, the term "includes" means includes but not limited to, the term "including" means including but not limited to. The term "based on" means based at least in part on. In addition, the terms "a" and "an" are intended to denote at least one of a particular element.

Figure 1:
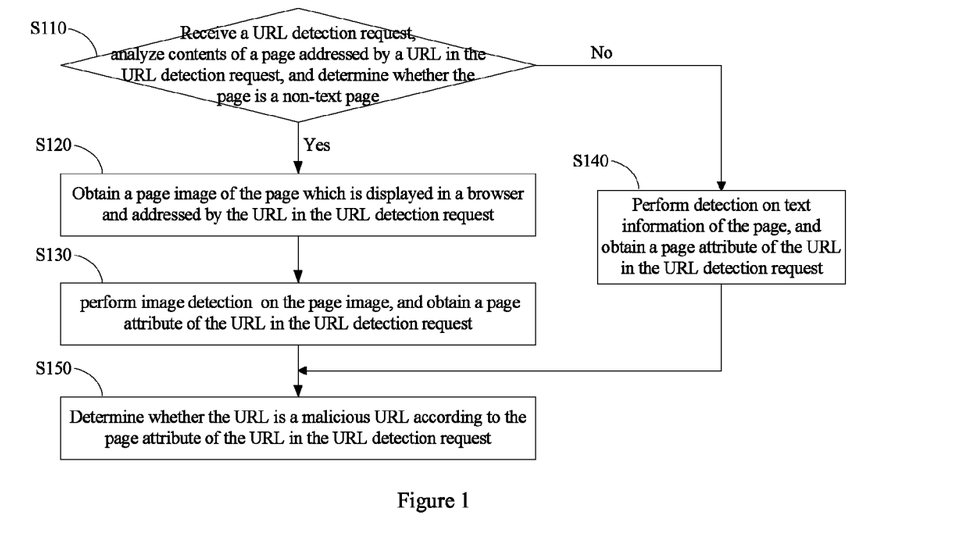
FIG. 1 is a flow diagram illustrating a method for detecting a malicious URL based on an example of the present disclosure.

FIG. 1 is a flow diagram illustrating a method for detecting a malicious URL based on an example of the present disclosure. As shown in FIG. 1, the method includes the following processes.

In block S110, a URL detection request is received, a page addressed by a URL in the URL detection request is analyzed, and it is determined that whether the page is a non-text page; when the page is a non-text page, proceed with block S120; otherwise, proceed with block S140.

The URL in the URL detection request may be a URL directly inputted by a user, or may be a URL generated after the user clicks a hyperlink. When the URL is received, it is possible to perform a preliminary analysis and filtration on the URL, and report suspicious URL, initiate a URL detection request. After the URL detection request is received, a page addressed by the URL in the URL detection request may be analyzed, so as to determine that whether the page is a text page or non-text page.

In block S120, a page image of the page, which is displayed in a browser and addressed by the URL in the URL detection request, is obtained.

After it is determined that the page addressed by the URL in the URL detection request is a non-text page, the browser is controlled to display the page in the background, and to take a picture snapshot of the displayed page, thus a page image of the page which is displayed in a browser and addressed by the URL in the URL detection request is obtained. The picture snapshot may be achieved through an open source WebKit browser kernel, of course, also may be achieved using other methods, for example, through the Firefox, the IE or other browser kernel.

In block S130, image detection is performed on the page image, and a page attribute of the URL in the URL detection request is obtained, then proceed with block S150.

In block S140, detection is performed on text information of the page, and a page attribute of the URL in the URL detection request is obtained, then proceed with block S150.

In block S150, whether the URL is a malicious URL is determined according to the page attribute of the URL in the URL detection request.

Whether through text content encryption, image conversion, streaming media or other information hiding technology, the page of a malicious URL will still be displayed in the browser, and conducts effective phishing scams. Therefore, in the examples of the present disclosure, contents of the page addressed by the URL in the URL detection request are analyzed. When it is determined that the page is a non-text page, a page snapshot is performed on the page which is addressed by the URL and displayed in the background of the browser, and snapshotted page image is detected to obtain a page attribute of the URL in the URL detection request. When it is determined that the page is a text page, text of the page is detected to obtain a page attribute of the URL in the URL detection request. Subsequently, whether the URL is a malicious URL is determined according to the page attribute of the URL in the URL detection request. Method for detecting a malicious URL based on the example of the present disclosure may effectively identify not only a malicious URL of which the whole webpage is an image, but also a malicious URL evading detection through various encryption methods, malicious interference, and so on. Thus the security of users when obtaining online information may be further ensured.

In general, other web pages may be nested in a web page browsed by a user. Therefore, in above mentioned block S110, when the URL detection request is received, URL crawler grabbing may be performed starting from the page addressed by a URL in the URL detection request, and a HTML document corresponding to each URL may be generated. For example, the URL in the URL detection request may be taken as an initial URL, and crawler grabbing is performed on contents of the page addressed by the initial URL through a web crawler, new URL addresses are continuously extracted from the page and putted in a queue until a terminating condition, such as crawler grabbing depth and breadth, preconfigured by the web crawler is satisfied. All URLs grabbed by the web crawler are analyzed and filtered, and then indexes are established for URLs after being analyzed and filtered. The URLs with established indexes may be stored, such that subsequent query and retrieval may be facilitated.

Subsequently, page analysis may be performed on each HTML document grabbed by the network crawler, and a Document Object Model (DOM) tree corresponding to each URL may be generated; data for determining a page attribute is obtained from each DOM tree, and it is determined whether the content feature of a page addressed by each URL is non-text content according to obtained data. Finally, it is determined whether the page addressed by the URL in the URL detection request is a non-text page according to content features of all URLs. The data for determining a page attribute may include executable JavaScript (JS), a page title and copyright information.

Figure 2:
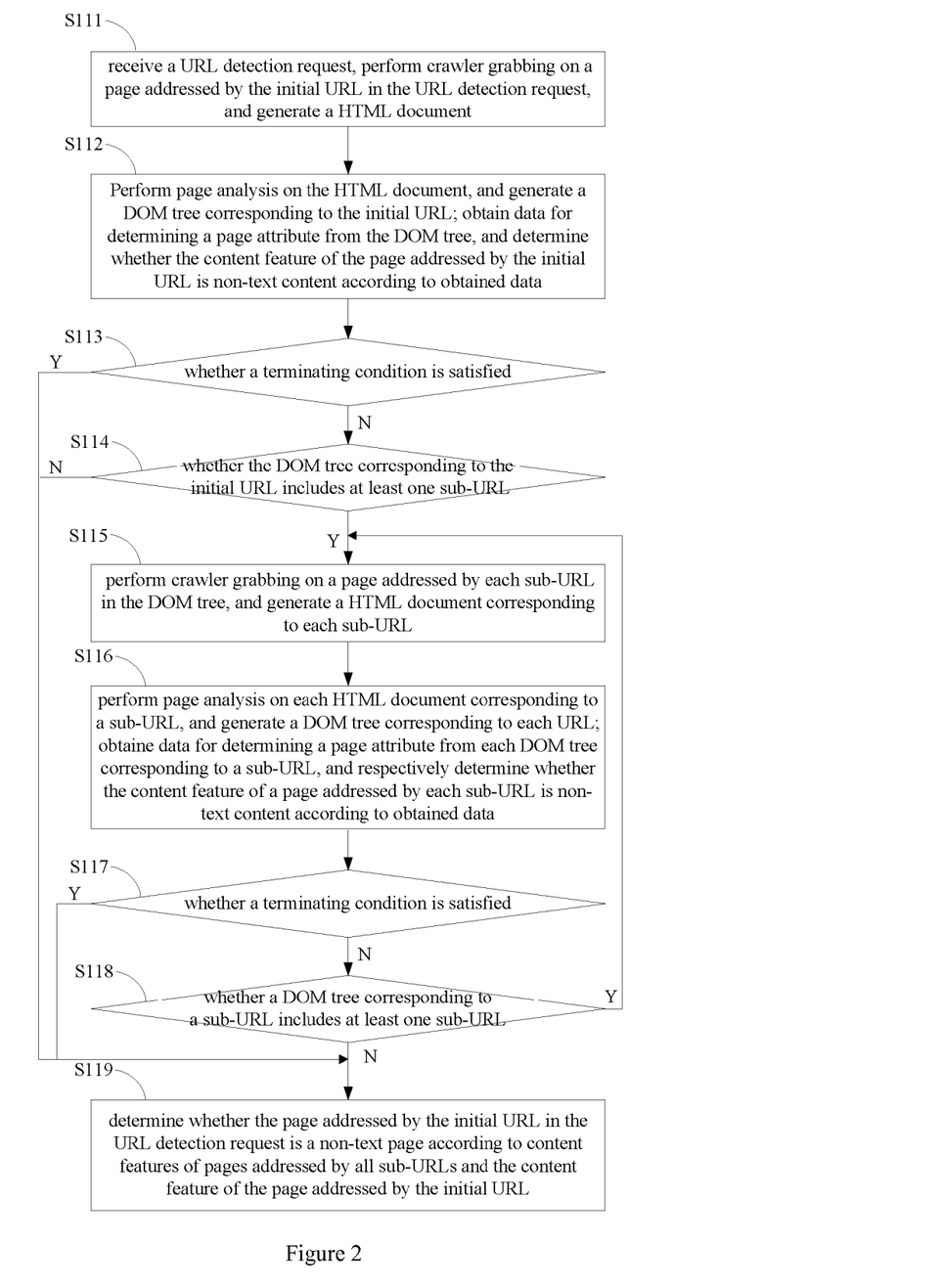
FIG. 2 is a flow diagram illustrating a procedure for analyzing a page addressed by a URL in a URL detection request in the method for detecting a malicious URL based on an example of the present disclosure.

For example, as shown in FIG. 2, above mentioned block S110 may include the following processes.

In block S111, a URL detection request is received, crawler grabbing is performed on a page addressed by the URL (referred to as the initial URL) in the URL detection request, and a HTML document is generated.

Specifically, a network crawler may perform the crawler grabbing according to a preset grabbing breadth.

In block S112, page analysis is performed on the HTML document, and a DOM tree corresponding to the initial URL is generated; data for determining a page attribute is obtained from the DOM tree, and it is determined whether the content feature of the page addressed by the initial URL is non-text content according to obtained data.

The data for determining a page attribute may include executable JavaScript (JS), a page title and copyright information.

Specifically, whether the content feature of the page addressed by the initial URL is non-text content may be determined according to tag information of the obtained data. For example, when there is only little text information of non-HTML tag or only HTML tag information in obtained data, it is determined that content feature of the page addressed by the initial URL is non-text content.

In block S113, it is determined whether a terminating condition, such as preset crawler grabbing depth, is satisfied, when the terminating condition is satisfied, proceed with block S119; otherwise, proceed with block S114.

In block S114, it is determined whether the DOM tree corresponding to the initial URL includes at least one sub-URL, when the DOM tree corresponding to the initial URL includes at least one sub-URL, proceed with block S115; otherwise, proceed with block S119.

In block S115, crawler grabbing is performed on a page addressed by each sub-URL in the DOM tree, and a HTML document corresponding to each sub-URL is generated.

Similarly, a network crawler may perform the crawler grabbing according to a preset grabbing breadth.

In block S116, page analysis is performed on each HTML document corresponding to a sub-URL, and a DOM tree corresponding to each URL is generated; data for determining a page attribute is obtained from each DOM tree corresponding to a sub-URL, and it is respectively determined whether the content feature of a page addressed by each sub-URL is non-text content according to obtained data.

The data for determining a page attribute may include executable JavaScript (JS), a page title and copyright information.

Specifically, whether the content feature of the page addressed by current sub-URL is non-text content may be determined according to tag information of obtained data corresponding to current sub-URL. For example, when there is only little text information of non-HTML tag or only HTML tag information in the obtained data, it is determined that content feature of the page addressed by current sub-URL is non-text content.

In block S117, it is determined whether a terminating condition, such as preset crawler grabbing depth, is satisfied, when the terminating condition is satisfied, proceed with block S119; otherwise, proceed with block S118.

In block S118, a DOM tree is extracted from DOM trees corresponding to sub-URLs in turn, and it is determined whether the DOM tree corresponding to a sub-URL includes at least one sub-URL, when the DOM tree corresponding to the sub-URL includes at least one sub-URL, return to block S115; otherwise, proceed with block S119.

In block S119, it is determined whether the page addressed by the initial URL in the URL detection request is a non-text page according to content features of pages addressed by all sub-URLs and the content feature of the page addressed by the initial URL.

Specifically, when content features of pages addressed by all sub-URLs and the content feature of the page addressed by the initial URL are all non-text content, it may be determined that the page addressed by the initial URL is a non-text page; otherwise, it may be determined that the page addressed by the initial URL is a text page.

Figure 3:
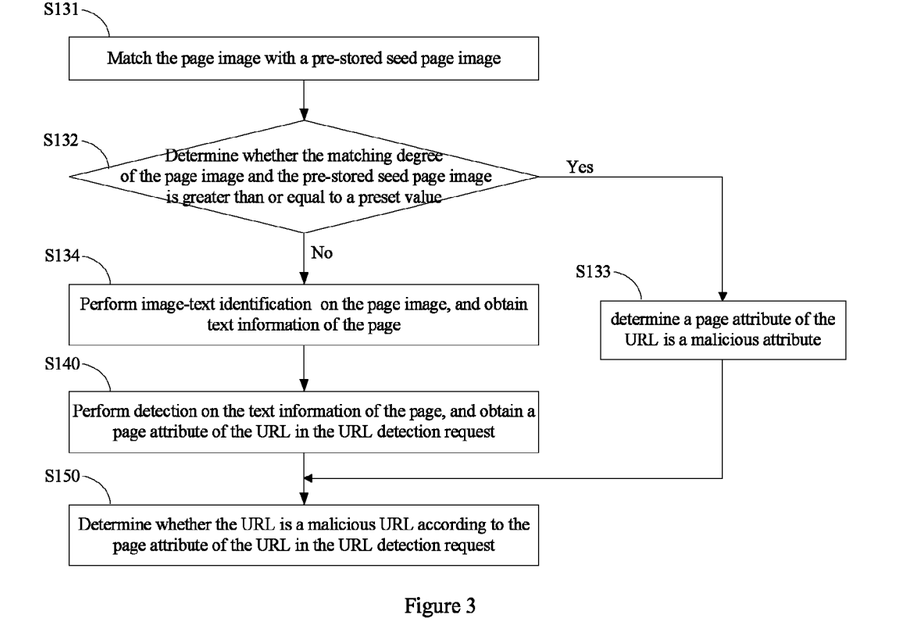
FIG. 3 is a flow diagram illustrating a procedure for processing a non-text page addressed by a URL in the URL detection request in the method for detecting a malicious URL based on an example of the present disclosure.

Furthermore, as shown in FIG. 3, above mentioned block S130 may include the following processes.

In block S131, the page image is matched with a pre-stored seed page image.

The seed page image is a pre-stored page image addressed by a malicious URL. The block S131 may include the followings.

Firstly, an image feature of a page image to be matched (hereinafter referred to as the "target image") are extracted.

For example, the size of the target image may be reduced to 64 pixels. The details of the target image may be removed, only the basic information, such as structure and chiaroscuro, may be retained, and the image difference result from different scales may be abandoned.

Subsequently, the extracted image feature is encoded.

For example, the reduced image may be converted to a 64 grayscale image. A gray average of the 64 pixels is calculated, the gray of each pixel is compared with the gray average, when the gray is greater than or equal to the gray average, the pixel is denoted as 1; when the gray is less than or equal to the gray average, the pixel is denoted as 0. Finally, a 64-bit integer is formed.

Finally, the encoded image feature is matched with pre-stored seed page images in a page image database, and a similarity, namely the matching degree, of the target image is obtained.

The 64-bit integer is matched with pre-stored page images in the page image database, when the number of different bits does not exceed a first threshold, it indicates that the two images are very similar; and when the number of different bits exceeds a second threshold, it indicates that the two images are different. In the example of the present disclosure, the first threshold is 5, and the second threshold is 10.

In block S132, it is determined that whether the matching degree of the page image and the pre-stored seed page image is greater than or equal to a preset value, when the matching degree of the page image and the pre-stored seed page image is greater than or equal to the preset value, proceed with block S133; otherwise, proceed with block S134.

The matching degree refers to the similarity degree when the target image is matched with the seed page image, namely the number of different bits of the two images. The smaller the number of different bits of the two images, the higher the matching degree of the two images, which represents that the URL of target image is a malicious URL. In the present example, the preset value is a matching degree corresponding to the number 5 of different bits.

In block S133, it is determined that a page attribute of the URL is a malicious attribute, proceed with block S150.

In block S134, image-text identification is performed on the page image, and text information of the page is obtained, proceed with block S140.

Furthermore, the method for performing detection on text information of the page in above mentioned block 140 may include one or more of the text segmentation, text similarity matching and machine identification.

The text segmentation refers to that segmentation is performed on text content of the page, and semantic information of the text information of the page is obtained. The text similarity matching refers to that similarity matching is performed on the semantic information obtained after the text segmentation and pre-stored text information of a malicious page, and a matching result is outputted. The machine identification refers to that detection is performed on the semantic information obtained after the text segmentation through a machine learning method, such as the Bayes classifier, a keyword model and a decision tree, and then a detection result is outputted.

Figure 4:
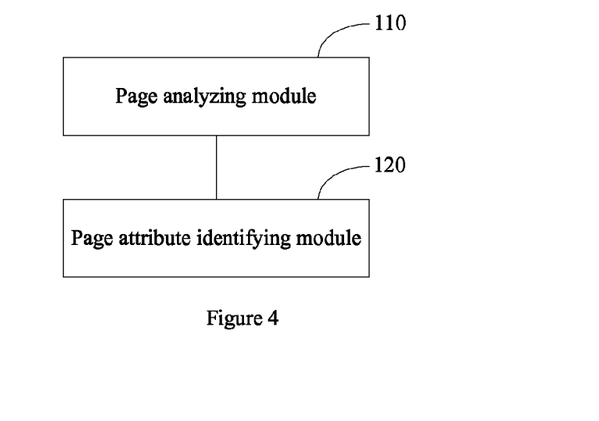
FIG. 4 is a schematic diagram illustrating a device for detecting a malicious URL based on an example of the present disclosure.

FIG. 4 is a schematic diagram illustrating a device for detecting a malicious URL based on an example of the present disclosure. As shown in FIG. 4, the device may include a page analyzing module 110 and a page attribute identifying module 120.

The page analyzing module 110 is configured to receive a URL detection request, analyze a page addressed by a URL in the URL detection request, and determine whether the page is a non-text page.

The page attribute identifying module 120 is configured to, when the page analyzing module 110 determines that the page is a non-text page, obtain a page image of the page, which is displayed in a browser and addressed by the URL in the URL detection request, perform image detection on the page image, obtain a page attribute of the URL in the URL detection request, and determine whether the URL is a malicious URL based on the page attribute of the URL in the URL detection request.

The URL in the URL detection request may be a URL directly inputted by a user, or may be a URL generated after the user clicks a hyperlink. When the URL is received, it is possible to perform a preliminary analysis and filtration on the URL, and report suspicious URL, initiate a URL detection request. After receiving the URL detection request, the page analyzing module 110 may analyze the page addressed by the URL in the URL detection request, so as to determine that whether the page is a text page or non-text page. When it is determined that the page is a non-text page, the page attribute identifying module 120 may control the browser to display the page in the background, and to take a picture snapshot of the displayed page, thus a page image of the page which is displayed in a browser and addressed by the URL in the URL detection request is obtained.

Whether through text content encryption, image conversion, streaming media or other information hiding technology, the page of a malicious URL will still be displayed in the browser, and conducts effective phishing scams. Therefore, in the examples of the present disclosure, contents of the page addressed by the URL in the URL detection request are analyzed. When it is determined that the page is a non-text page, a page snapshot is performed on the page which is addressed by the URL and displayed in the background of the browser, and snapshotted page image is detected to obtain a page attribute of the URL in the URL detection request. When it is determined that the page is a text page, text of the page is detected to obtain a page attribute of the URL in the URL detection request. Subsequently, whether the URL is a malicious URL is determined according to the page attribute of the URL in the URL detection request. Method for detecting a malicious URL based on the example of the present disclosure may effectively identify not only a malicious URL of which the whole webpage is an image, but also a malicious URL evading detection through various encryption methods, malicious interference, and so on. Thus the security of users when obtaining online information may be further ensured.

Figure 5:
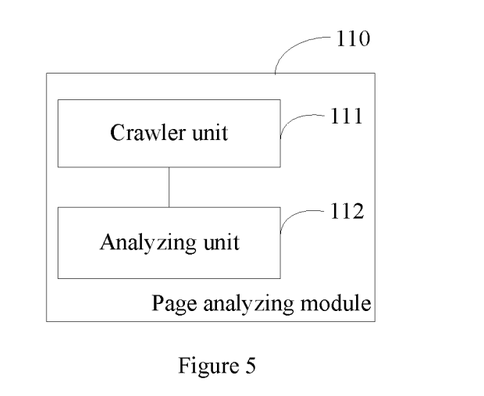
FIG. 5 is a schematic diagram illustrating a page analyzing module of the device for detecting a malicious URL based on an example of the present disclosure.

FIG. 5 is a schematic diagram illustrating a page analyzing module of the device for detecting a URL based on an example of the present disclosure. As shown in FIG. 5, above mentioned page analyzing module 110 may include a crawler unit 111 and an analyzing unit 112.

The crawler unit 111 is configured to receive a URL detection request, perform crawler grabbing starting from the page addressed by the URL in the URL detection request, and generate a HTML document corresponding to each URL.

The analyzing unit 112 is configured to perform page analysis on each HTML document grabbed by the network crawler, and generate a DOM tree corresponding to each URL; obtain data for determining a page attribute from each DOM tree, and determine whether the content feature of a page addressed by each URL is non-text content according to obtained data, then determine whether the page addressed by the URL in the URL detection request is a non-text page according to content features of all URLs. For example, the analyzing unit may determine that the page addressed by the URL in the URL detection request is a non-text page when content features of pages addressed by all URLs are all non-text content; and determine that the page addressed by the URL in the URL detection request is a text page when not all content features of pages addressed by all URLs are non-text content.

In general, other web pages are nested in a web page browsed by a user. When the URL detection request is received, the URL in the URL detection request is taken as an initial URL. The crawler unit 111 may perform crawler grabbing on contents of the page addressed by the initial URL, and continuously extract new URL addresses from the page and put extracted URL addresses in the URL queue until a stopping condition, such as crawler grabbing depth and breadth, preconfigured by a web crawler is satisfied. All URLs grabbed by the crawler unit 111 are analyzed and filtered, and then indexes are established for URLs after being analyzed and filtered. The URLs with established indexes may be stored, such that subsequent query and retrieval may be facilitated. The analyzing unit 112 may perform page analysis on each HTML document grabbed by the crawler unit 111, obtain data, such as executable JavaScript (JS), a page title and copyright information, for determining page attributes, and determine whether the content feature of a page addressed by each URL is non-text content according to obtained data, and then determine whether the page addressed by the URL in the URL detection request is a non-text page according to content features of all URLs.

Figure 6:
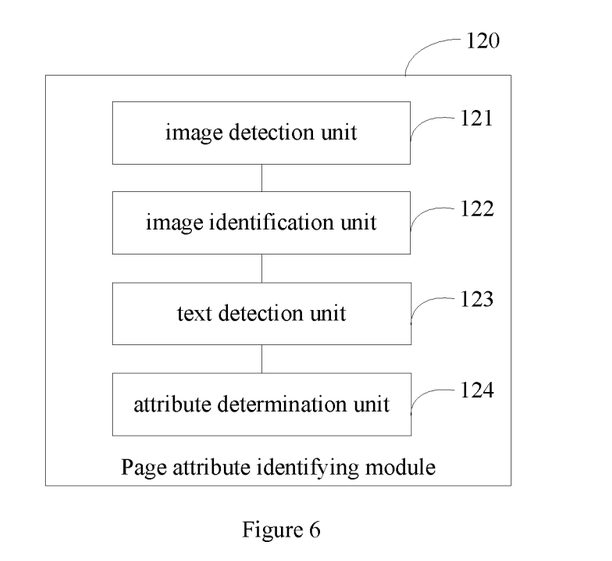
FIG. 6 is a schematic diagram illustrating a page attribute identifying module of the device for detecting a malicious URL based on an example of the present disclosure.

FIG. 6 is a schematic diagram illustrating a page attribute identifying module of the device for detecting a malicious URL based on an example of the present disclosure. As shown in FIG. 6, above mentioned page attribute identifying module 120 may include an image detection unit 121, an image identification unit 122, a text detection unit 123 and an attribute determination unit 124.

The image detection unit 121 is configured to match the page image with a pre-stored seed page image, when a matching degree of the page image and the pre-stored seed page image is greater than or equal to a preset value, determine a page attribute of the URL is a malicious attribute.

The image identification unit 122 is configured to, when the matching degree of the page image and the pre-stored seed page image is less than the preset value, perform image-text identification on the page image, and obtain text information of the page.

The text detection unit 123 is configured to perform detection on the text information of the page, and obtain a page attribute of the URL.

The attribute determination unit 124 is configured to determine whether the URL is a malicious URL according to the page attribute of the URL in the URL detection request.

Furthermore, the text detection unit 123 is further configured to, when it is determined that the page addressed by the URL in the URL detection request is a text page, perform detection on text information of the page, and obtain a page attribute of the URL.

Furthermore, the method for detecting text information of the page by the text detection unit 123 may include one or more of the text segmentation, text similarity matching and machine identification.

Figure 7:
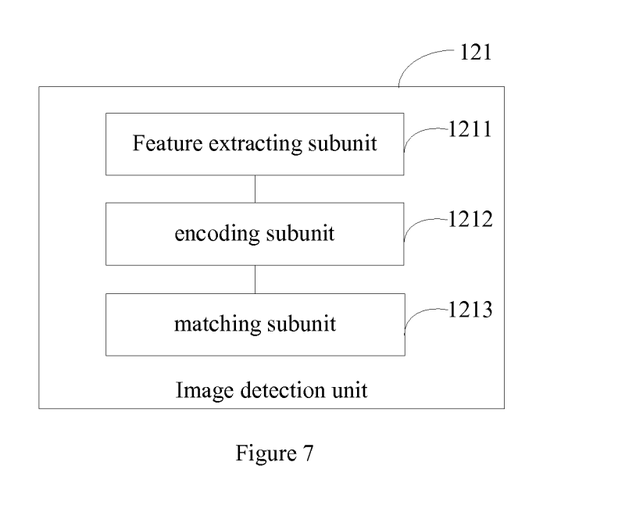
FIG. 7 is a schematic diagram illustrating an image detection unit of the page attribute identifying module shown in FIG. 6 based on an example of the present disclosure.

FIG. 7 is a schematic diagram illustrating the image detection unit of the page attribute identifying module shown in FIG. 6 based on an example of the present disclosure. As shown in FIG. 7, above mentioned image detection unit may further include a feature extracting subunit 1211, an encoding subunit 1212 and a matching subunit 1213.

The feature extracting subunit 1211 is configured to extract an image feature of the page image.

The encoding subunit 1212 is configured to encode extracted image feature.

The matching subunit 1213 is configured to match encoded image feature with pre-stored seed page images in a page image database, and obtain a matching degree corresponding to the page image.

The above examples may be implemented by hardware, software, firmware, or a combination thereof. For example the various methods, processes and functional modules described herein may be implemented by a processor (the term processor is to be interpreted broadly to include a CPU, processing unit/module, ASIC, logic module, or programmable gate array, etc.). The processes, methods and functional modules may all be performed by a single processor or split between several processors; reference in this disclosure or the claims to a 'processor' should thus be interpreted to mean 'one or more processors'. The processes, methods and functional modules are implemented as machine readable instructions executable by one or more processors, hardware logic circuitry of the one or more processors or a combination thereof. The modules, if mentioned in the aforesaid examples, may be combined into one module or further divided into a plurality of sub-modules. Further, the examples disclosed herein may be implemented in the form of a software product. The computer software product is stored in a non-transitory storage medium and comprises a plurality of instructions for making an electronic device implement the method recited in the examples of the present disclosure.

Figure 8:
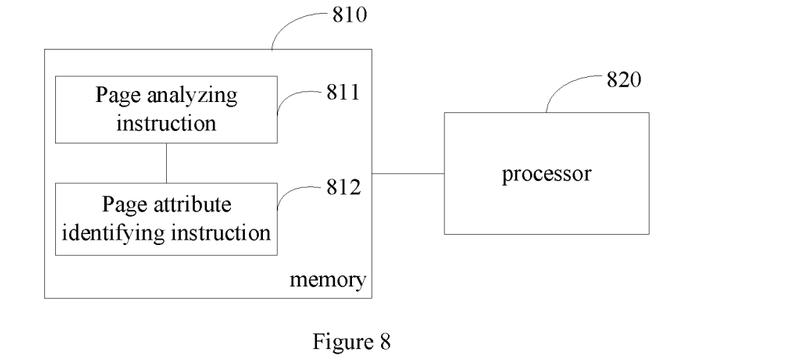
FIG. 8 is a schematic diagram illustrating a device for detecting a malicious URL based on another example of the present disclosure.

For example, FIG. 8 is a schematic diagram illustrating another structure of the device for detecting a malicious URL based on an example of the present disclosure. As shown in FIG. 8, the device may include a memory 810 and a processor 820 in communication with the memory 810.

The memory 810 may store a group of instructions which may be executed by the processor 820. The instructions may include a page analyzing instruction 811 and a page attribute identifying instruction 812, which may be respectively executed by the processor 820 to respectively implement the operations of the page analyzing module 110 and the page attribute identifying module 120 mentioned above.

Furthermore, the page analyzing instruction 811 may further include a crawler instruction and an analyzing instruction, which may be respectively executed by the processor 820 to respectively achieve the operations of the crawler unit 111 and the analyzing unit 112 mentioned above.

Similarly, the page attribute identifying instruction 812 may further include an image detection instruction, an image identification instruction, a text detection instruction and an attribute determination instruction, which may be respectively executed by the processor 720 to respectively achieve the operations of the image detection unit 121, an image identification unit 122, a text detection unit 123 and an attribute determination unit 124 mentioned above.

The image detection instruction 121 may further include a feature extracting instruction, an encoding instruction and a matching instruction, which may be respectively executed by the processor 720 to respectively implement the operations of the feature extracting subunit 1211, the encoding subunit 1212 and the matching subunit 1213 mentioned above.

The foregoing description, for purpose of explanation, has been described with reference to specific examples. However, the illustrative discussions above are not intended to be exhaustive or to limit the present disclosure to the precise forms disclosed. Many modifications and variations are possible in view of the above teachings. The examples were chosen and described in order to best explain the principles of the present disclosure and its practical applications, to thereby enable others skilled in the art to best utilize the present disclosure and various examples with various modifications as are suited to the particular use contemplated.

What is claimed is:

1. A method for detecting a malicious Uniform/Universal Resource Locator, URL, comprising:
receiving a URL detection request;
analyzing a first page addressed by a URL in the URL detection request;
processing the first page addressed by the URL in the URL detection request in a form of an image, to obtain a first image associated with the first page;
performing image detection on the first image;

obtaining an attribute of the first page addressed by the URL in the URL detection request according to a result of the image detection; and determining the URL is malicious when the attribute of the first page addressed by the URL in the URL detection request is a malicious attribute, wherein performing the image detection on the first image further comprises: matching the first image with a pre-stored image corresponding to a second page addressed by a malicious URL, including:

extracting an image feature of the first image based on pixels of the first image;

encoding the image feature; and matching the encoded image feature with images pre-stored in a page image database for obtaining a matching degree of the first image and the pre-stored image, wherein the attribute of the first page is determined based on the matching degree.

2. The method according to claim 1, wherein before processing the first page, analyzing the first page further comprises:

performing crawling starting from the first page addressed by the URL in the URL detection request according to one or more of preset crawling depth and preset crawling width, and obtaining a HTML document corresponding to each URL obtained during the crawling;

performing page analysis on each HTML document, and generating a Document Object Model, DOM, tree document corresponding to each URL;

obtaining data for determining an attribute from each DOM tree, and determining whether content feature of each page addressed by each URL is non-text content according to the obtained data; and    determining whether to process the first page addressed by the URL in the form of the image according to content features of pages addressed by all URLs obtained during the crawling.

3. The method according to claim 2, wherein determining whether to process the first page addressed by the URL in the form of the image according to content features of all URLs comprises:

when content features of pages addressed by all URLs are all non-text content, determining to process the first page addressed by the URL in the form of the image;

when not all content features of pages addressed by all URLs are non-text content, determining not to process the first page addressed by the URL in the form of the image.

4. The method according to claim 1, wherein obtaining the attribute of the first page further comprises:

when the matching degree of the first image and the pre-stored image is greater than or equal to a preset value, determining the attribute of the first page addressed by the URL is a malicious attribute;

when the matching degree of the first image and the pre-stored image is less than the preset value,      performing image-text identification on the first image to obtain identified text from the first image of the first page;

analyzing the identified text of the first page to obtain an analysis result; and      obtaining the attribute of the first page addressed by the URL according to the analysis result of the identified text.

5. The method according to claim 2, further comprising: when determining not to process the first page addressed by the URL in the form of the image, detecting text-type information of the first page, and obtaining the attribute of the first page addressed by the URL based on the text-type information.

6. The method according to claim 4, wherein the analyzing the identified text of the first page comprises:

adopting one or more of text segmentation, text similarity matching and machine learning to analyze the identified text.

7. The method according to claim 5, wherein detecting text-type information of the first page comprises:

adopting one or more of text segmentation, text similarity matching and machine learning to detect the text-type information.

8. A device for detecting a malicious Uniform/Universal Resource Locator, URL, comprising: a memory and a processor in communication with the memory;

the memory store a group of instructions which may be executed by the processor, and the instructions comprise:

a page analyzing instruction, to indicate receiving a URL detection request, analyzing contents of a first page addressed by a URL in the URL detection request; and    an attribute identifying instruction, to indicate, processing the first page addressed by the URL in the URL detection request in a form of an image, to obtain a first image associated with the first page, performing image detection on the first image; obtaining an attribute of the first page addressed by the URL in the URL detection request according to a result of the image detection, and determining the URL is malicious when the attribute of the first page addressed by the URL in the URL detection request is a malicious attribute,    wherein performing the image detection on the first image further comprises: matching the first image with a pre-stored image corresponding to a second page addressed by a malicious URL, including:

extracting an image feature of the first image based on pixels of the first image;

encoding the image feature; and matching the encoded image feature with images pre-stored in a page image database, for obtaining a matching degree between the first image and the pre-stored image, wherein the attribute of the first page is determined based on the matching degree.

9. The device according to claim 8, wherein:

the page analyzing instruction further comprises:

a crawler instruction, to indicate, before processing the first page, performing crawling starting from the first page addressed by the URL in the URL detection request according to one or more of preset crawling depth and preset crawling width, and obtaining a HTML document corresponding to each URL obtained during the crawling; and an analyzing instruction, to indicate performing page analysis on each HTML document grabbed by the crawler instruction, generating a DOM tree corresponding to each URL;

obtaining data for determining an attribute from each DOM tree, determining whether the content feature of each page addressed by each URL is non-text content according to the obtained data, determining whether to process the first page addressed by the URL in the form of the image according to content features of pages addressed by all URLs obtained during the crawling.

10. The device according to claim 8, wherein the attribute identifying instruction comprises:

an image detection instruction, to indicate, when the matching degree of the first image and the pre-stored image is greater than or equal to a preset value, determining the attribute of the first page addressed by the URL is a malicious attribute;

an image identification instruction, to indicate, when the matching degree of the first image and the pre-stored image is less than the preset value, performing image-text identification on the first image to obtain identified text from the first image of the first page;

a text detection instruction, to indicate performing analysis on the identified text of the first page to obtain an analysis result, and obtaining the attribute of the first page addressed by the URL according to the analysis result of the identified text.

11. The device according to claim 10, wherein the text detection instruction is further to indicate, when it is determined not to process the first page addressed by the URL in the form of the image, performing detection on text-type information of the first page, and obtaining the attribute of the first page addressed by the URL based on the text-type information.

12. The device according to claim 10, wherein the text detection instruction is to indicate adopting one or more of text segmentation, text similarity matching and machine learning to analyze the identified text.

13. The device according to claim 11, wherein the text detection instruction is to indicate adopting one or more of text segmentation, text similarity matching and machine learning to detect the text-type information.

14. The method according to claim 2, wherein determining whether content feature of each page addressed by each URL is non-text content according to the obtained data further comprises:
when the obtained data corresponding to a page includes only HTML tag information, determining that the content feature of the page is non-text content.

15. The method according to claim 1, wherein:
encoding the image feature further comprises: encoding the image feature as a first integer; and matching the encoded image feature with images pre-stored in the page image database further comprises:
comparing the first integer corresponding to the first image with a second integer corresponding to the pre-stored image in the page image database to obtain the matching degree of the first image and the pre-stored image, wherein the images pre-stored in the page image database are images of pages addressed by malicious URLs.

16. The method according to claim 1, wherein: encoding the image feature further comprises:
converting the first image to a grayscale image containing n pixels;
calculating an average grayscale value of the n pixels; and
generating the first integer having n bits corresponding to the n pixels, including: for each bit of the first integer, if a grayscale value of a corresponding pixel is less than the average grayscale value, encoding the bit as 0; and if the grayscale value of the corresponding pixel is greater than or equal to the average grayscale value, encoding the bit as 1.

17. The method according to claim 16, wherein comparing the first integer corresponding to the first image with the second integer corresponding to the pre-stored image further comprises:
obtaining a quantity of different bits between the first integer and the second integer to obtain the matching degree.

18. The device according to claim 8, wherein determining whether to process the first page addressed by the URL in the form of the image according to content features of all URLs comprises:
when content features of pages addressed by all URLs are all non-text content, determining to process the first page addressed by the URL in the form of the image;
when not all content features of pages addressed by all URLs are non-text content, determining not to process the first page addressed by the URL in the form of the image.

* * * * *